United States Patent
Novack et al.

(10) Patent No.: US 10,928,593 B2
(45) Date of Patent: Feb. 23, 2021

(54) FIBER HOLDER

(71) Applicant: Elenion Technologies, LLC, New York, NY (US)

(72) Inventors: Ari Jason Novack, New York, NY (US); Amir Hanjani, Cincinnati, OH (US); Anna Mikami, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/151,079

(22) Filed: Oct. 3, 2018

(65) Prior Publication Data
US 2020/0110223 A1    Apr. 9, 2020

(51) Int. Cl.
G02B 6/36    (2006.01)
G02B 6/42    (2006.01)

(52) U.S. Cl.
CPC ......... *G02B 6/3616* (2013.01); *G02B 6/4285* (2013.01)

(58) Field of Classification Search
CPC ...... G02B 6/36; G02B 6/4285; G02B 6/3616; G02B 6/3608; G02B 6/3628; G02B 6/3648; G02B 6/423; G02B 6/1225; G02B 6/30; G02B 6/428; G02B 6/4273; G02B 6/4272; G02B 2006/12111
See application file for complete search history.

(56) References Cited

U.S. PATENT DOCUMENTS

| | | | | |
|---|---|---|---|---|
| 6,776,551 | B2 * | 8/2004 | Linnenbuerger | F16B 2/065 24/19 |
| 7,835,069 | B2 * | 11/2010 | Hamada | H01S 3/06704 359/337 |
| 2002/0126978 | A1 * | 9/2002 | Holman | G02B 6/4453 385/135 |
| 2002/0168147 | A1 * | 11/2002 | Case | G02B 6/2553 385/53 |
| 2003/0123836 | A1 * | 7/2003 | Fujisawa | B08B 3/12 385/137 |
| 2005/0276562 | A1 * | 12/2005 | Battey | G02B 6/4454 385/135 |
| 2009/0220204 | A1 * | 9/2009 | Ruiz | G02B 6/4454 385/135 |
| 2014/0348478 | A1 * | 11/2014 | Isenhour | G02B 6/4236 385/135 |
| 2016/0124164 | A1 * | 5/2016 | Doerr | G02B 6/423 385/14 |

FOREIGN PATENT DOCUMENTS

EP    1193402 A1 *    4/2002    ............. F16B 2/065

* cited by examiner

*Primary Examiner* — Thomas A Hollweg
*Assistant Examiner* — Mary A El-Shammaa
(74) *Attorney, Agent, or Firm* — Stratford Managers Corporation

(57) ABSTRACT

In order to bond an opto-electronic device with fiber pigtails to a larger PCB, the fibers need to be secured in place so that they don't become entangled in the bonding elements resulting in misalignment of the electronic connectors and of the optics. Accordingly, there is a need for packaged parts, which enables customers to use their own surface mount technology (SMT) bonding process without the fiber pigtails interfering with the process. Ideally, the fiber holder device is disposable and provides a spool and a fiber track to guide the fibers from the package to the spool. Ideally, an opening is provided through the spool to enable the components on the opto-electronic device to be accessed.

20 Claims, 9 Drawing Sheets

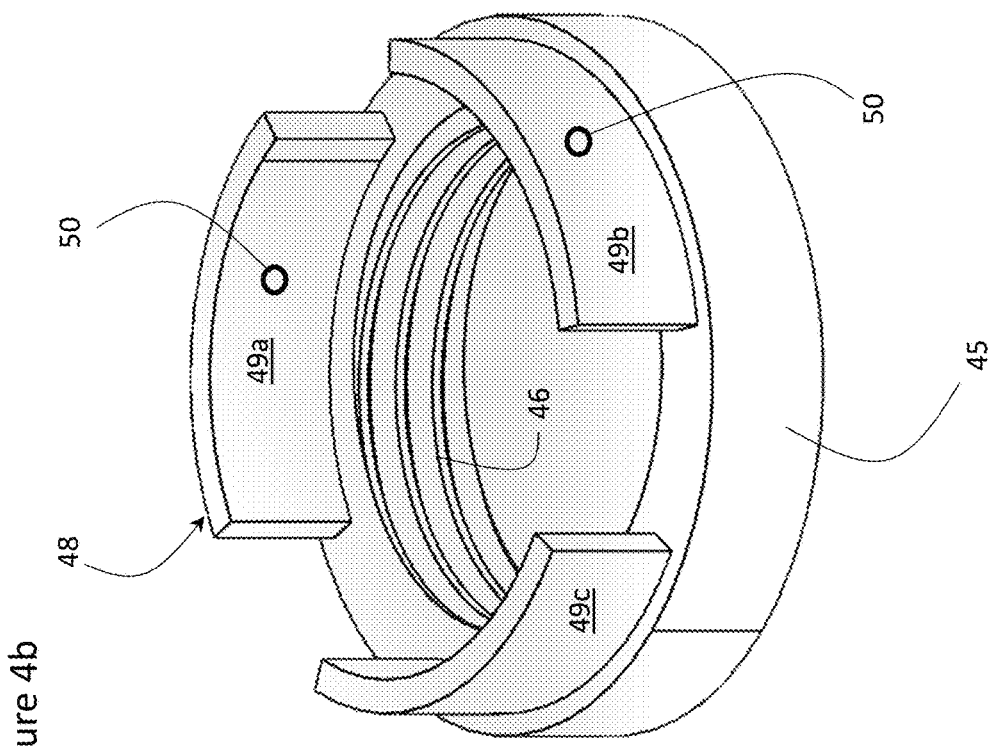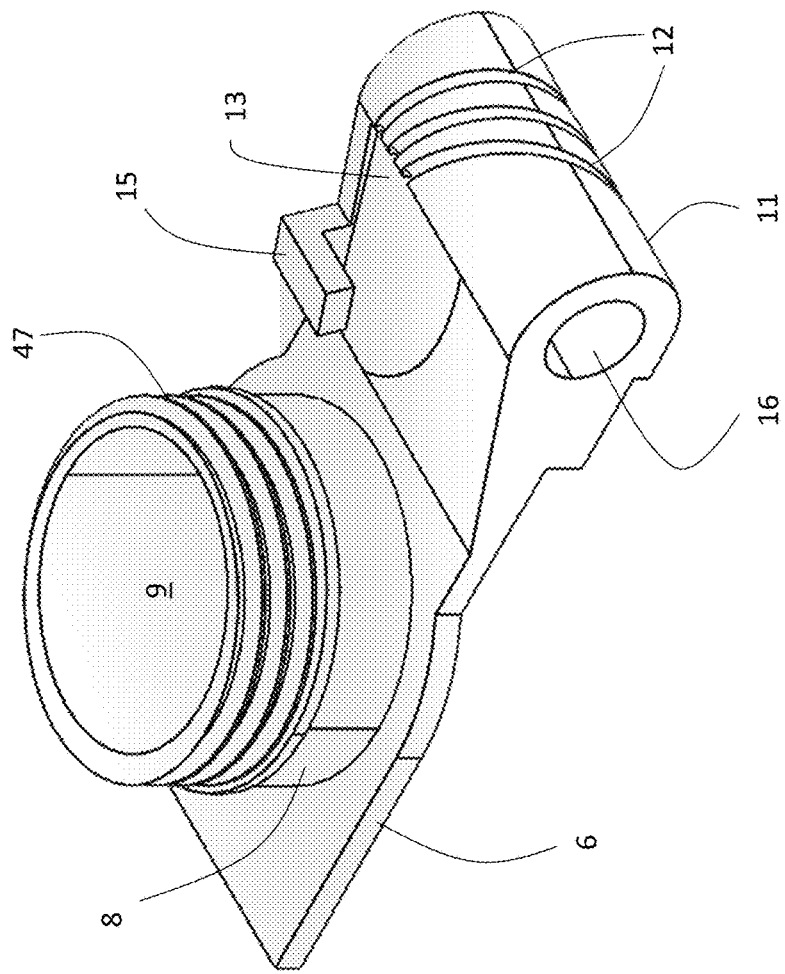

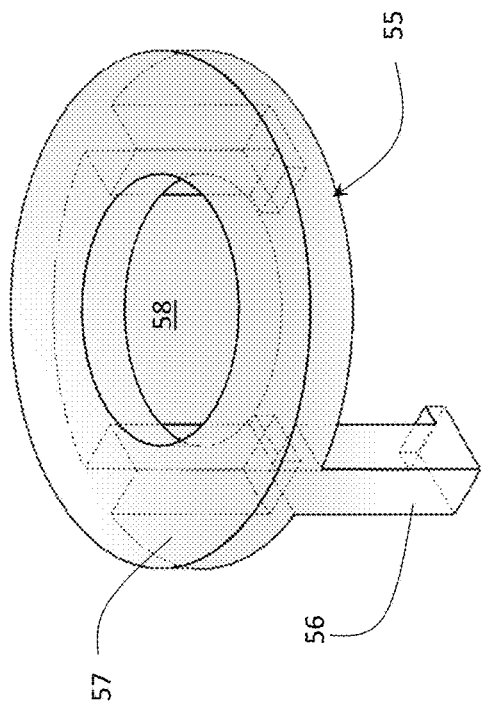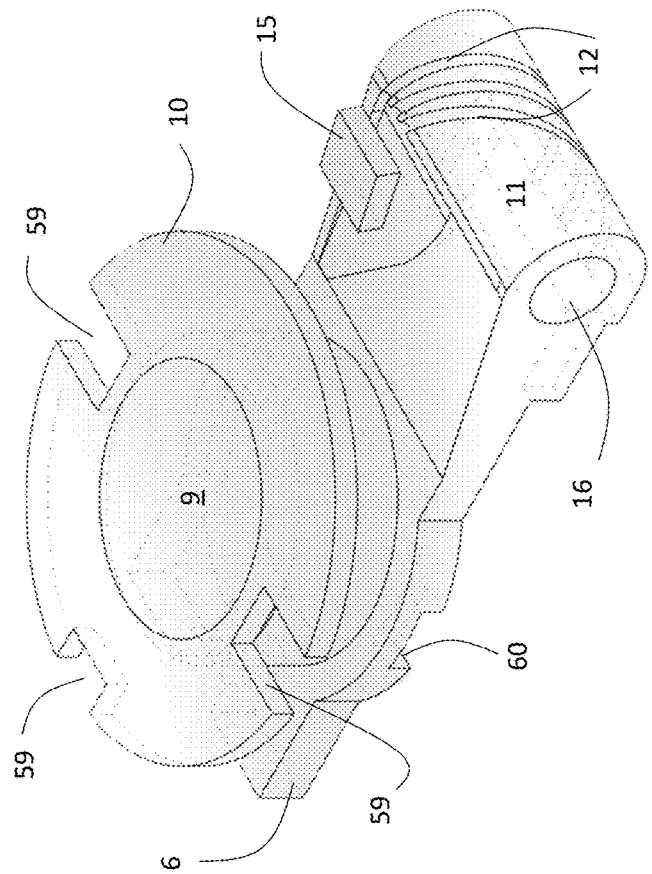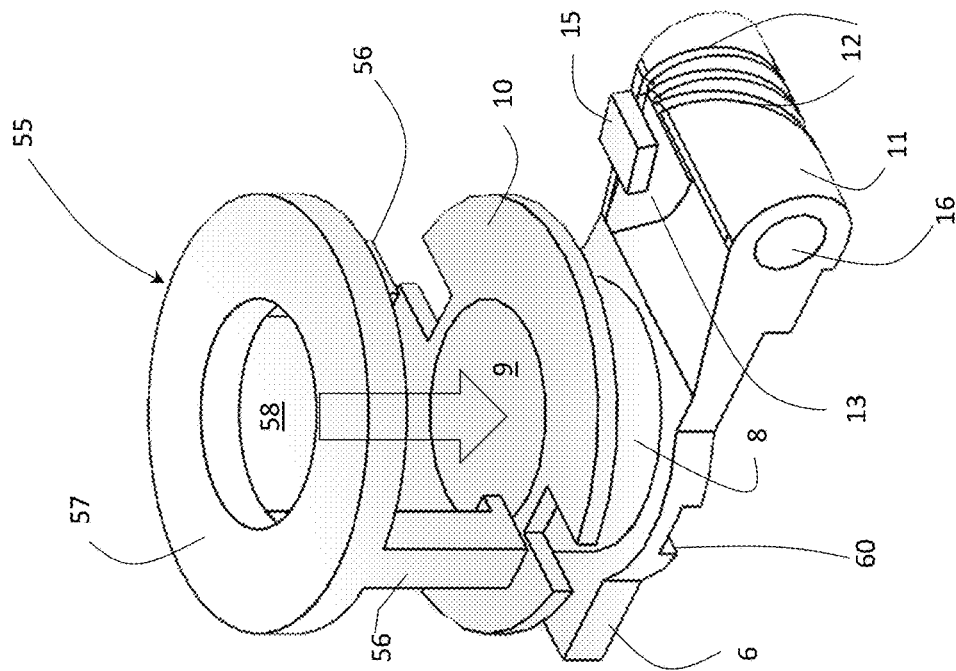

FIBER HOLDER

TECHNICAL FIELD

The present invention relates to a fiber holder device, and in particular to a disposable fiber holder device for temporarily holding fiber pigtails during shipping and final assembly.

BACKGROUND

Conventional photonic devices with fiber pigtails, which are supposed to be ball grid array (BGA) bonded to a printed circuit board (PCB), have limitation when using typical pick and place bonders because the dangling fibers may cause misalignments with the BGA bonds and the optical coupling, if the fibers or the optical connection is damaged during final assembly.

In order to bond a BGA device with fiber pigtails to a PCB, the fibers need to be secured in place so that they don't become entangled in the BGA bonds in post pick and place steps, and prior and during reflow steps. The challenges to make a suitable fiber holder device include: 1) attachment of the fiber holder device to the device housing; 2) fiber routing and spooling; 3) securing the fibers ends; and 4) being inexpensive, i.e. enabling the device to be disposable.

An object of the present invention is to overcome the shortcomings of the prior art by providing completed packaged parts for shipment to customers, which enables the customers to use their own surface mount technology (SMT) BGA bonding process for attaching the parts to the PCBs, without the fiber pigtails interfering with the process. Ideally, the fiber holder device is disposable and provides a fiber track to guide the fibers from the package to the fiber holder's spool.

SUMMARY OF THE INVENTION

Accordingly, the present invention relates to a fiber holder device for mounting on an opto-electronic device, which includes at least one fiber extending therefrom, during assembly of the surface-mounted device onto a circuit board, comprising:

a body for mounting on the surface-mounted device;

a spool extending from the body capable of receiving each fiber wound therearound; and a fiber guide extension extending from the body for guiding the fibers from the surface-mounted device upwardly and back to the spool.

BRIEF DESCRIPTION OF THE DRAWINGS

The invention will be described in greater detail with reference to the accompanying drawings which represent preferred embodiments thereof, wherein:

FIGS. 4a and 4b are isometric views of an alternative embodiment of the fiber holder device of the present invention;

FIGS. 5a and 5b are isometric views of an alternative embodiment of the fiber holder device of the present invention;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
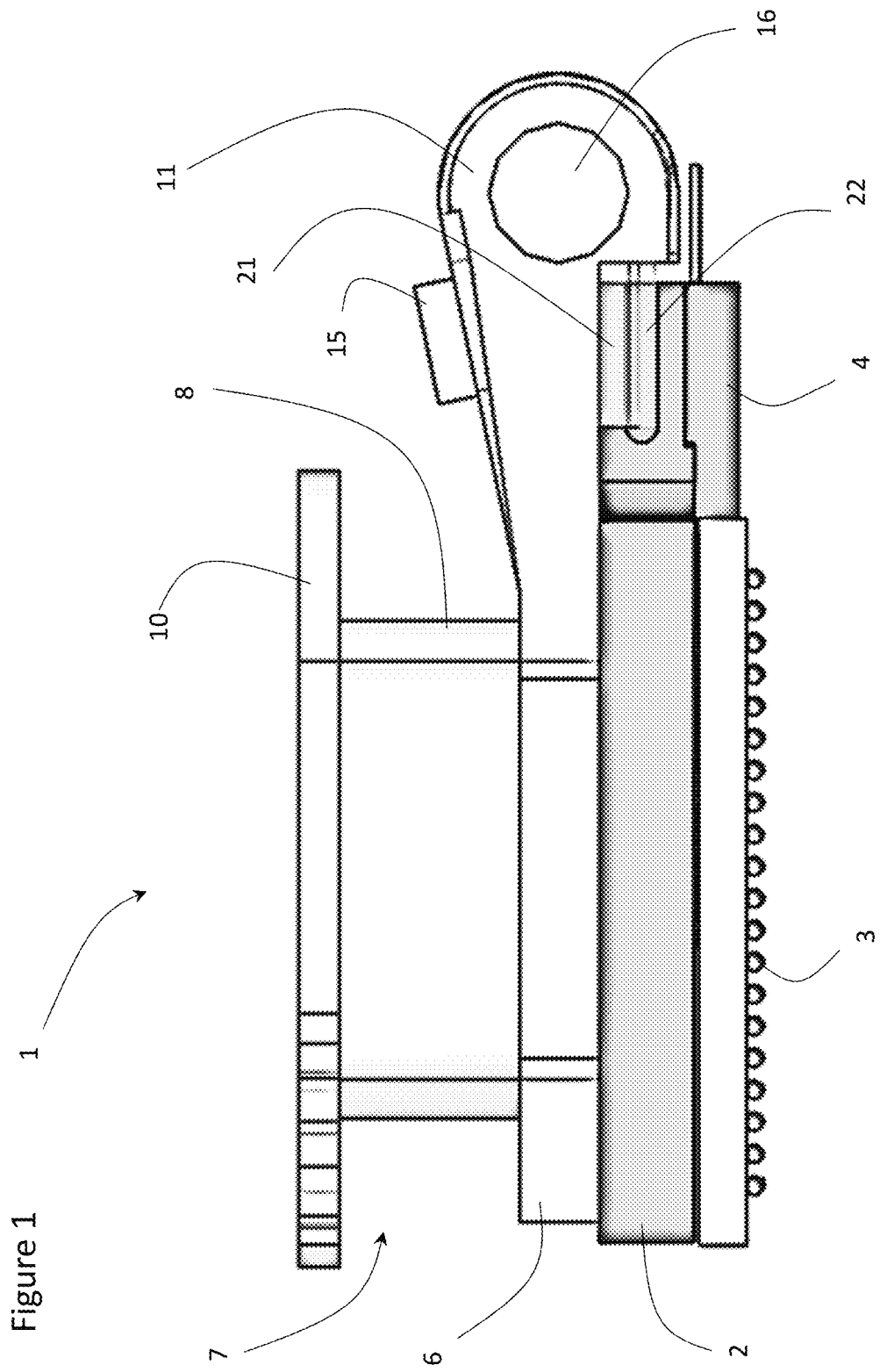
FIG. 1 is an side view of a fiber holder device in accordance with an embodiment of the present invention.
Figure 2:
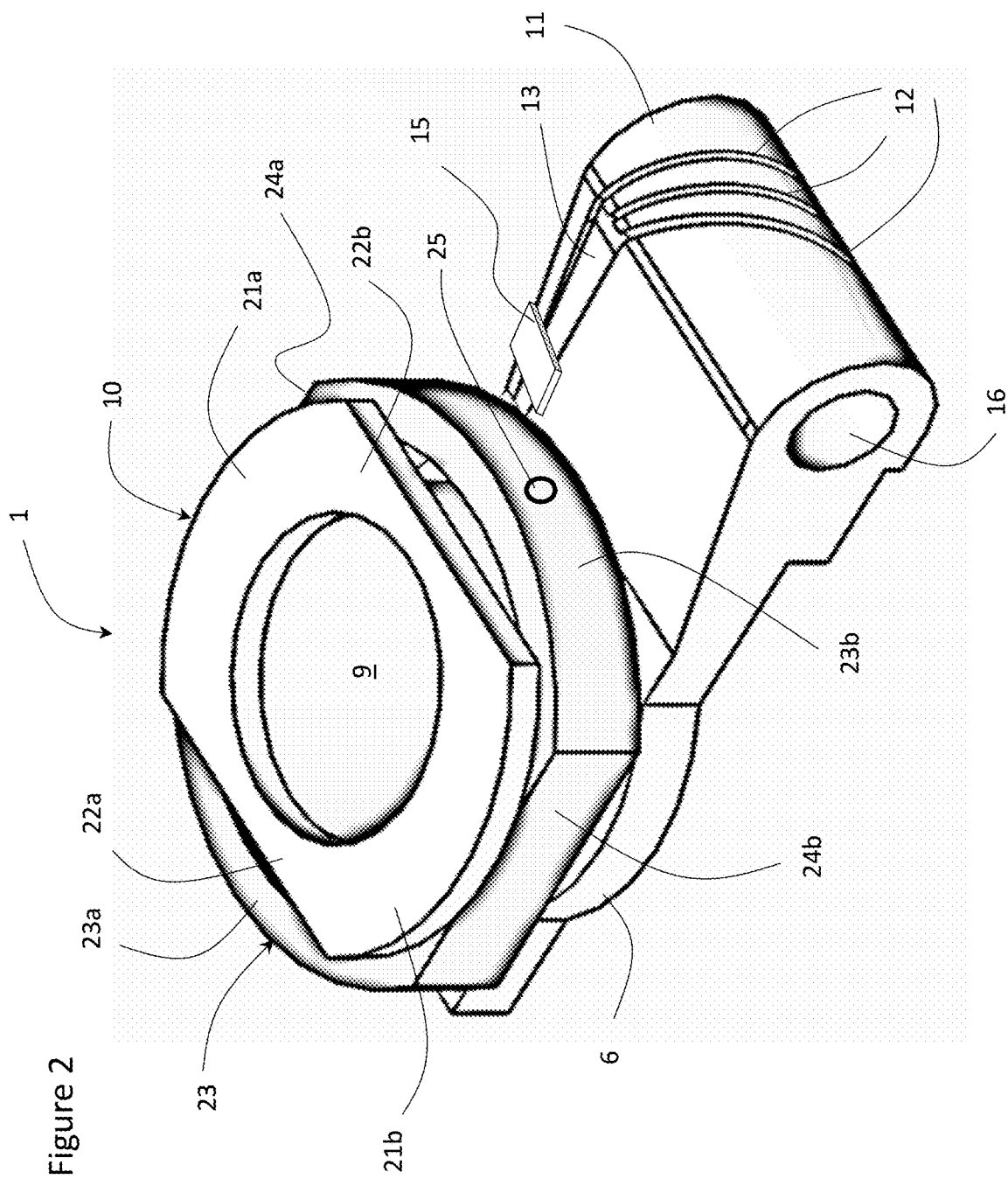
FIG. 2 is an isometric view of the fiber holder device of FIG. 1.

With reference to FIGS. 1 and 2, a fiber holder device 1 of the present invention is designed to be temporarily attached to a surface mounted device, such as an electronic, optical or opto-electronic device, e.g. a photonic integrated circuit (PIC) 2, which may include a BGA 3 or other suitable electrical connector for mounting the PIC 2 onto a PCB or other suitable main circuit board, e.g. ceramic, (not shown), and an optical fiber or an electrical wire extending therefrom, optically coupled to optical waveguides or electrically coupled to electrical traces on the PIC 2. A fiber feedthrough 4 or some other suitable connector or housing may be provided as an interface between the PIC 2 and the optical fiber or fibers extending therefrom. The fiber holder device 1 comprises a main body 6 for mounting on the PIC 2, and a spool section 7 to hold the outer free ends of the optical fibers. The main body 6 may be any suitable shape, but typically is rectangular and/or matches the shape of the PIC 2 for mounting around the outer edges of the PIC 2. The spool section 7 may include a cylindrical spool 8 with a longitudinal axis perpendicular to the surface of the PIC 2, and an opening 9 extending through the spool 8 along the longitudinal axis for a pick and place pick up head of an SMT apparatus to interface with the top surface of the PIC 2 and/or to enable viewing of the top of the PIC 2, while the fiber holder 1 is in place. The spool 8 may include a plurality of grooves or tracks to facilitate winding of the individual fibers. A lip 10 may be included around the top of the spool 8 with a diameter larger than the diameter of the spool 8 to prevent the fibers from slipping off the end of the spool 8. Furthermore, the lip 10 may include a flat upper surface, whereby the fiber holder 1 or 1' plus a SMT component may sit in a JEDEC tray.

The fiber holder device 1 may also include a fiber guiding extension 11 extending from one side of the main body 6 mounted overtop of the location where the fiber exits the PIC 2, e.g. the fiber feedthrough 4. The extension may include a rounded end surface, which may include routing tracks 12 for guiding the fibers extending from the PIC 2, e.g. the fiber feedthrough 4, to the spool section 7 on top. The illustrated embodiment includes three separate routing tracks 12 extending from three separate fiber feedthroughs 4 diverging into a single collector track 13 on top of the extension 11 just prior to the spool section 7. The rounded end surface of the extension 11 includes a radius of curvature that enables the fibers to be directed upwardly from the PIC 2 and back onto the spool 8 without undergoing too tight of a bend that might reduce confinement of the light in the fiber. Additional extensions 11 corresponding to additional fiber feedthroughs 4 or optical fibers may be provided on other sides of the fiber holder device 1 and PIC 2, respectively. The fibers may be small bend radius fiber or polyimide fibers. The routing tracks 12 and spool 8 may be adapted to fit any one or a combination of single mode fibers, polyimide fiber, multi-mode fiber, polarization maintaining fiber or a fiber array. A hook 15 may be provided extending up from an edge of the extension 11 and over the collector track 13 to further guide the optical fiber and facilitate the winding of the optical fiber onto the spool 8.

A hole 16 may be provided in the rounded end of the extension 11 extending laterally parallel to the surface of the PIC 2 and perpendicular to the opening 9. The hole 16 is for changing the location of the SMT tool's center of the mass.

The loose ends of the fibers after being spooled around spool 8 may be secured to the spool section 7 using any suitable fastener, for example: a heat shrunk tubing or a clamp, such as those illustrated in FIGS. 2, 3, 4 and 5. With reference to FIG. 2, the lip 10 on the spool section 7 includes curved portions 21a and 21b on a first set of opposite ends, concentric with the opening 9, and flat portions 22a and 22b on a second set of opposite ends. The second set of flat ends being closer together than the first set of curved ends. Similarly, an O-clamp 23 may be provided with an opening sized to receive the lip 10, i.e. with curved portions 23a and 23b on opposite ends and flat portions 24a and 24b on opposite ends, both slightly larger than the corresponding ends 21a/21b and 22a/22b of the lip 10. The outer surface of the flat portions 24a and 24b of the O-clamp 23 being spaced apart at a distance smaller than the outer surfaces of the curved portions 21a and 21b of the lip 10. Accordingly, the O-clamp 23 may fit over the lip 10 when oriented with the curved ends 23a and 23b of the O-clamp 23 matching the curved ends 21a and 21b of the lip 10, but when rotated the flat ends 24a and 24b of the O-clamp 23 fit under the wider rounded ends 21a and 21b of the lip 10, thereby preventing the O-clamp 23 from being removed from the spool section 7 and securing the ends of the fibers to the spool 8. The O-clamp 23 may include a hole 25 extending therethrough for receiving and securing an outer free end of an optical fiber. Accordingly, rotation of the O-clamp 23 around the spool section 8, with the outer free end of the optical fiber secured in the hole 25 facilitates the winding of the optical fiber onto the spool 8. Alternatively, if the outer free end of the optical fiber includes an optical coupler, the hole 25 may be at the top edge of the O-clamp 23 forming a groove through which the end of the optical fiber proximate the optical coupler may be received with the optical coupler extending outside the O-clamp 23. A connector may be provided on the outside of the O-clamp for receiving the optical coupler, either a mating optical coupler or some other form of connector.

Figure 3:
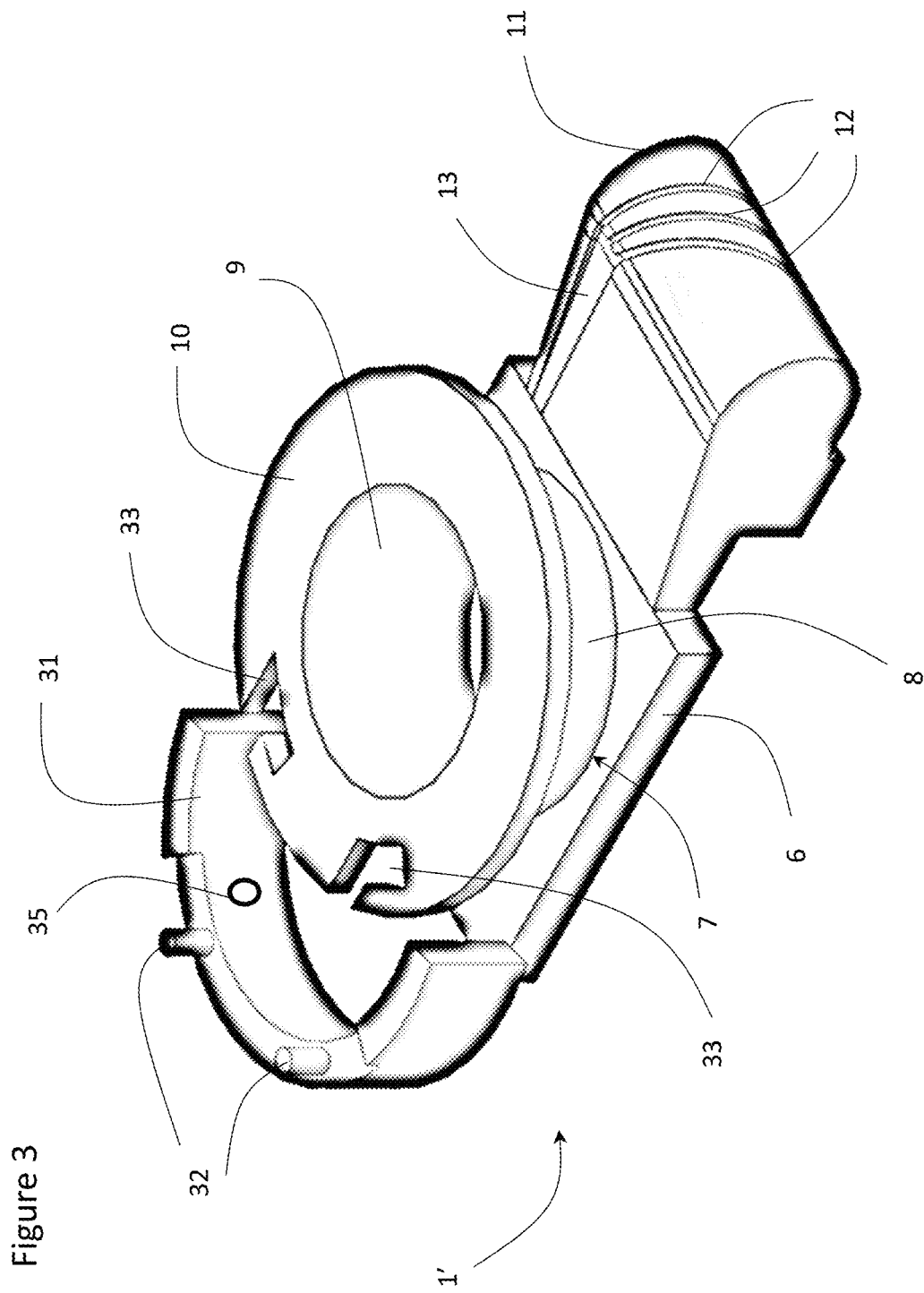
FIG. 3 is an isometric view of an alternative embodiment of the fiber holder device of the present invention.

In an alternative embodiment of a fiber holder device 1' illustrated in FIG. 3, a C-clamp 31 may be inserted into the side of the spool section 7, and then locked into place holding the ends of the fibers between the C-clamp 31 and the spool 8. The remaining elements are substantially the same as fiber holder device 1. The C-clamp 31 may include a first connector or set of connectors for mating with a second connector or set of connectors on the spool section 7. In the illustrated embodiment of FIG. 3, the first connector comprises pins 32, which are received in L-shaped grooves 33 provided in the lip 10 of the spool section 7 forming a bayonet style connector. During assembly, the pins 32 are slide into a first section of the grooves 33 and then the entire C-clamp 31 is rotated as the pins 32 slide down a second section of the grooves 33 formed at a perpendicular or obtuse angle to the first section of the grooves 33, thereby locking the C-clamp 31 in place on the spool 8.

The C-clamp 31 may include a hole 35 extending therethrough for receiving and securing an outer free end of an optical fiber. Alternatively, if the outer free end of the optical fiber includes an optical coupler, the hole 35 may be at the top edge of the C-clamp 31 forming a groove through which the end of the optical fiber proximate the optical coupler may be received with the optical coupler extending outside the C-clamp 31. A connector may be provided on the outside of the C-clamp 31 for receiving the optical coupler, either a mating optical coupler or some other form of connector.

In an alternate embodiment illustrated in FIGS. 4a and 4b, a fiber holder device 1" may include a screw clamp 45 for mounting on top of the spool 8 and holding the fibers in place. The remaining elements are substantially the same as fiber holder device 1 and 1'. The screw clamp 45 may include an internally threaded upper portion 46 for engaging an externally threaded portion 47 extending around the spool 8. The screw clamp 45 may include a flat upper surface forming the lip 10. The screw clamp 45 may also include a cylindrical sleeve 48, ideally comprised of a plurality of arcuate sections, e.g. first, second and third arcuate sections 49a, 49b and 49c, extending downwardly from the upper portion 46 proximate the outer edge of the upper portion 46, whereby the arcuate sections 49a, 49b and 49c will be spaced apart from the spool 8, providing space for the optical fiber(s) to be wound around the spool 8. In other words, the diameter of the cylindrical sleeve 48 is greater than the diameter of the spool 8. The cylindrical sleeve 48, i.e. one or more of the arcuate sections 49a, 49b and 49c may include a hole 50 for receiving an end of an optical fiber, whereby rotation of the screw clamp 45 while being mounted on the threaded portion 47 may also result in the optical fiber being simultaneously wound onto the spool 8. The outer free end of the cylindrical sleeve 48, i.e. the arcuate sections 49a, 49b and 49c, also provide a hard stop surface for engaging an upper surface of the main body 6 ensuring that the screw clamp 45 does not get overtightened onto the threaded portion 47. A connector may be provided on the outside of the screw clamp 45 for receiving the optical coupler, either a mating optical coupler or some other form of connector.

In an alternate embodiment illustrated in FIGS. 5a and 5b, a fiber holder device 1'" may include a snap clamp 55 for mounting on top of the spool 8 and holding the fibers in place. The remaining elements are substantially the same as fiber holder device 1, 1' or 1". The snap clamp 55 may include a plurality of spring fingers 56, e.g. three illustrated, that extend downwardly from an upper portion 57. The upper portion 57 may be circular with an opening 58 aligned with the opening 9. The lip 10 may include openings 59 enabling the spring fingers 56 to extend therethrough into engagement with locking members 60 in or on the main body 6. In the illustrated embodiment, the locking members 60 comprise a recess in the main body 6 formed to receive an end of a projection extending from the outer free end of the spring finger 56. A connector may be provided on the outside of the snap-clamp 55 for receiving the optical coupler, either a mating optical coupler or some other form of connector.

Figure 7:
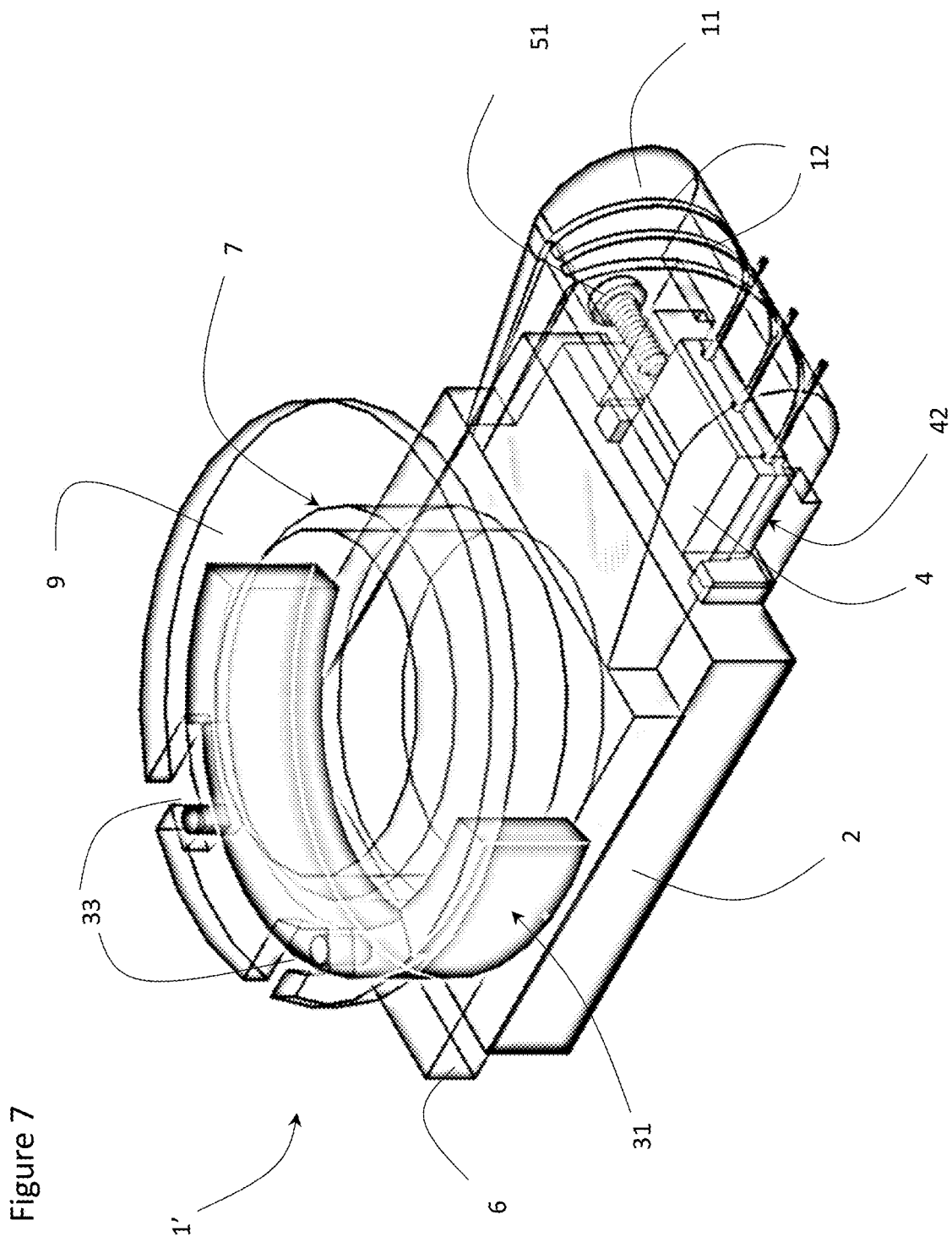
FIG. 7 is an isometric view of an alternative coupler of the device of FIG. 3.
Figure 8:
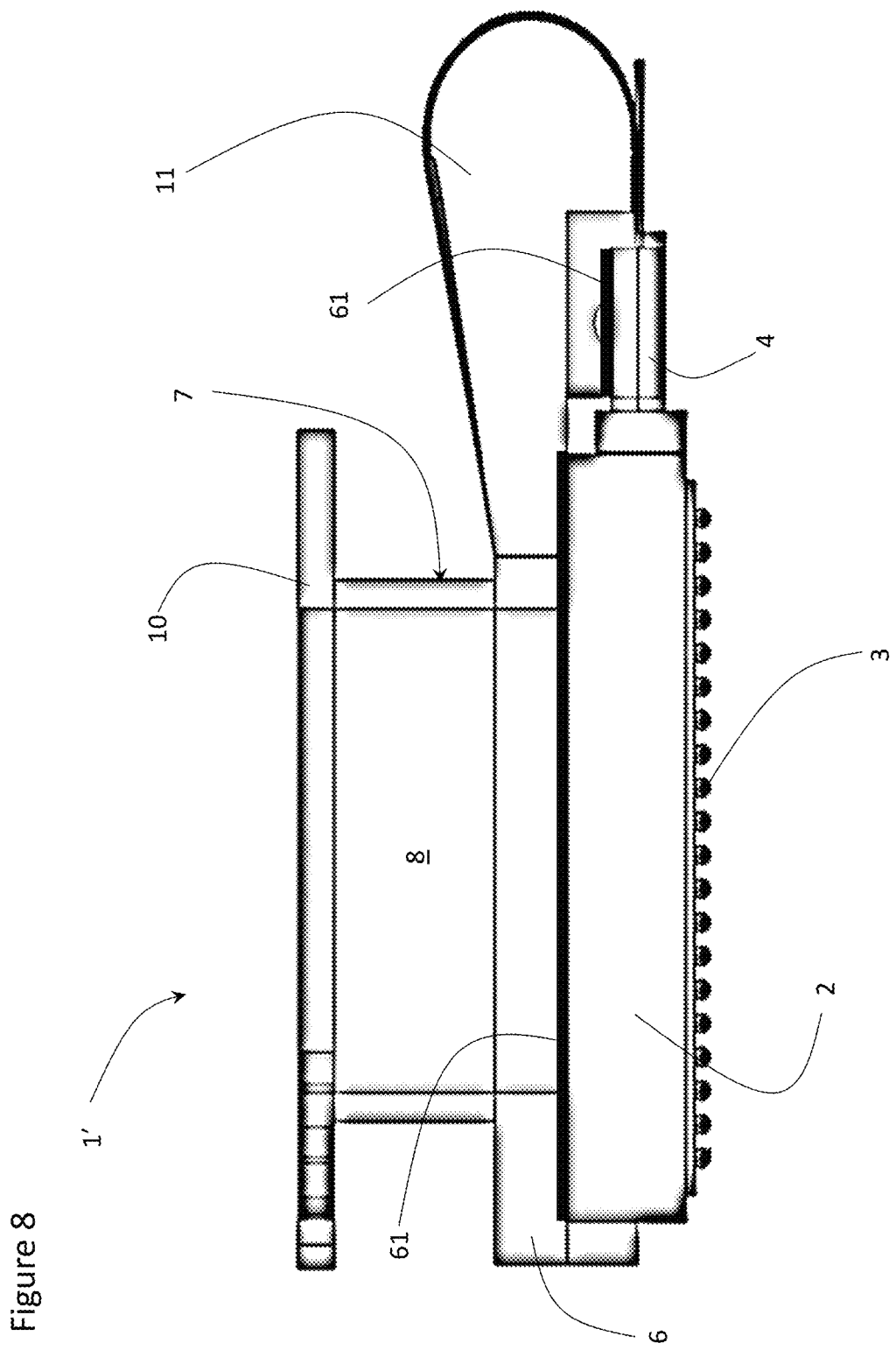
FIG. 8 is a side view of an alternative coupler of the device of FIG. 3.

The fiber holder device 1, 1', 1" and 1'" may be attached to the PIC 2 using a variety of suitable means including sliding grooves (FIG. 1), spring loaded pins (FIG. 6), tension screws (FIG. 7) or double-sided transfer tapes (FIG. 8).

With reference to FIG. 1, a first set of couplers 21, e.g. tongue and groove and/or dovetail grooves, may be provided on the underside of the extension 11 for mating with a corresponding second set of couplers 22 on an upper surface of the fiber feedthrough 4 for attaching the fiber holder device 1 to the PIC 2.

Figure 6:
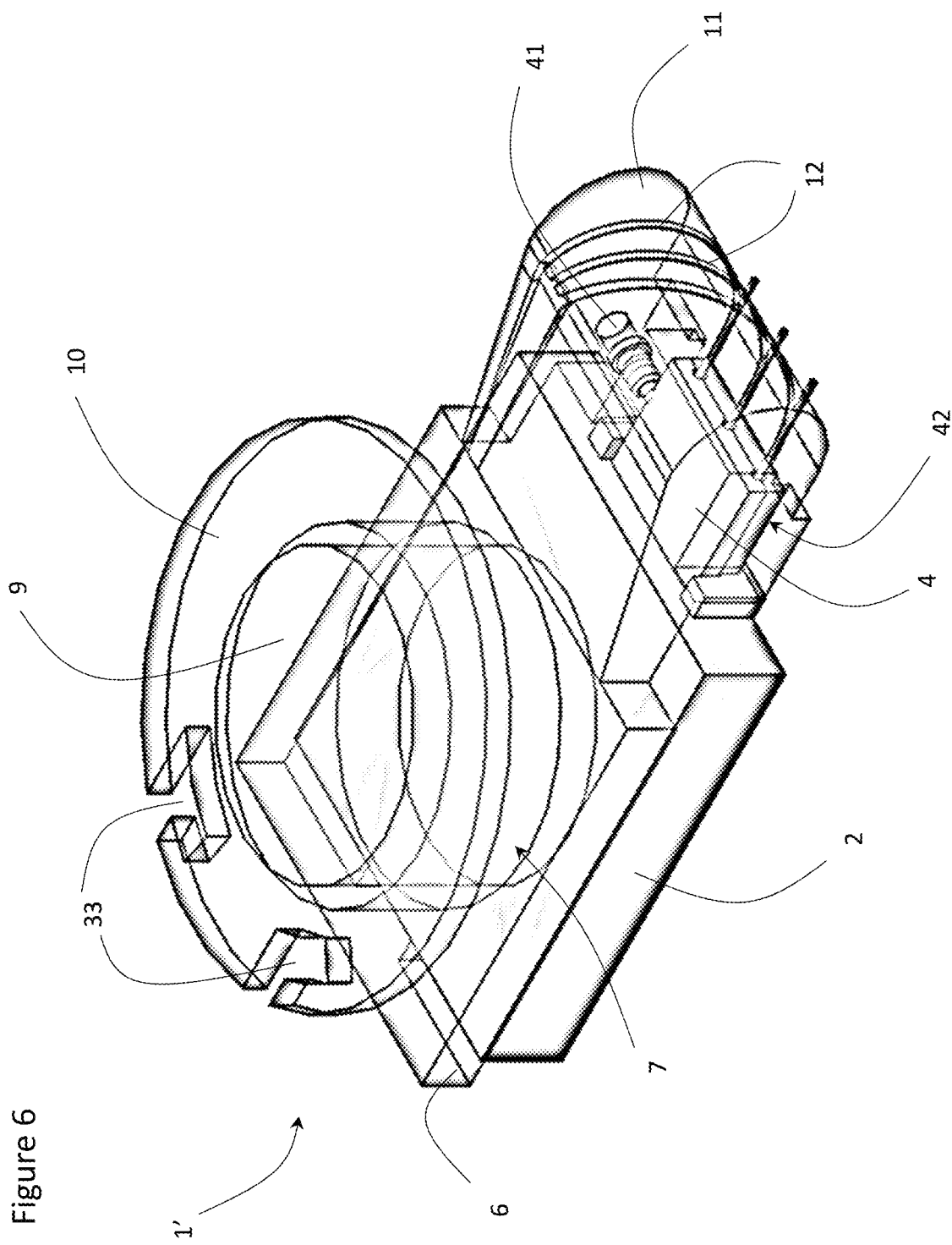
FIG. 6 is an isometric view of an alternative coupler of the device of FIG. 3.

With reference to FIGS. 6 and 7, one or more spring loaded, e.g. pogo pins 41 or tension screws 51, may be provided to press fit the fiber holder device 1 to the PIC 2. The location of the pogo pins 41 or tensions screws 51 may be set on any side exterior surface of the fiber holder device extending into contact with the PIC 2. In the illustrated embodiments in FIGS. 4 and 5, an underside of the extension 11 includes a recess 42 for receiving the fiber feedthrough 4, and one or more spring loaded, e.g. pogo pins 41 or tension screws 51 may be provided to press fit the fiber feedthrough 4 to the recess 42. The single spring loaded pin 41 or tension screw 51 extends through a side wall of the recess 42 in the extension 11 into contact with, e.g. an indentation in, the fiber feedthrough 4.

With reference to FIG. 8, the fiber holder device 1, 1', 1" or 1'" may be attached to the PIC 2 with high temperature double sided tape 61, e.g. polyimide tape with low tack on one side and high tack on the other. The high tack side may be placed on the fiber holder device 1, and low tack side may be placed on top surface of the PIC 2.

The fiber holder 1, 1', 1" and 1'" may be manufactured using techniques, such as 3D printing, molding, metal stamping, and CNC machining of metal, high temperature plastic or polymers. The fiber holder 1 and 1' may be comprised of one or more high temperature plastic/polymers, such as: Nylon 12™, Ultem™, High temperature urethane materials, and Teflon™. The fiber holder 1 and 1' may also be comprised of a thermally shielding material, e.g. survive solder reflow of >260° C., to protect the fibers from direct heat exposure, including metal, metal-coated, or with a metal part on the exterior. The fiber holder 1, 1', 1" and 1'" may comprise less expensive and less durable material in applications in which the device is disposable, but more expensive and more durable materials may be used in the construction, if the device is to be reused.

Figure 9:
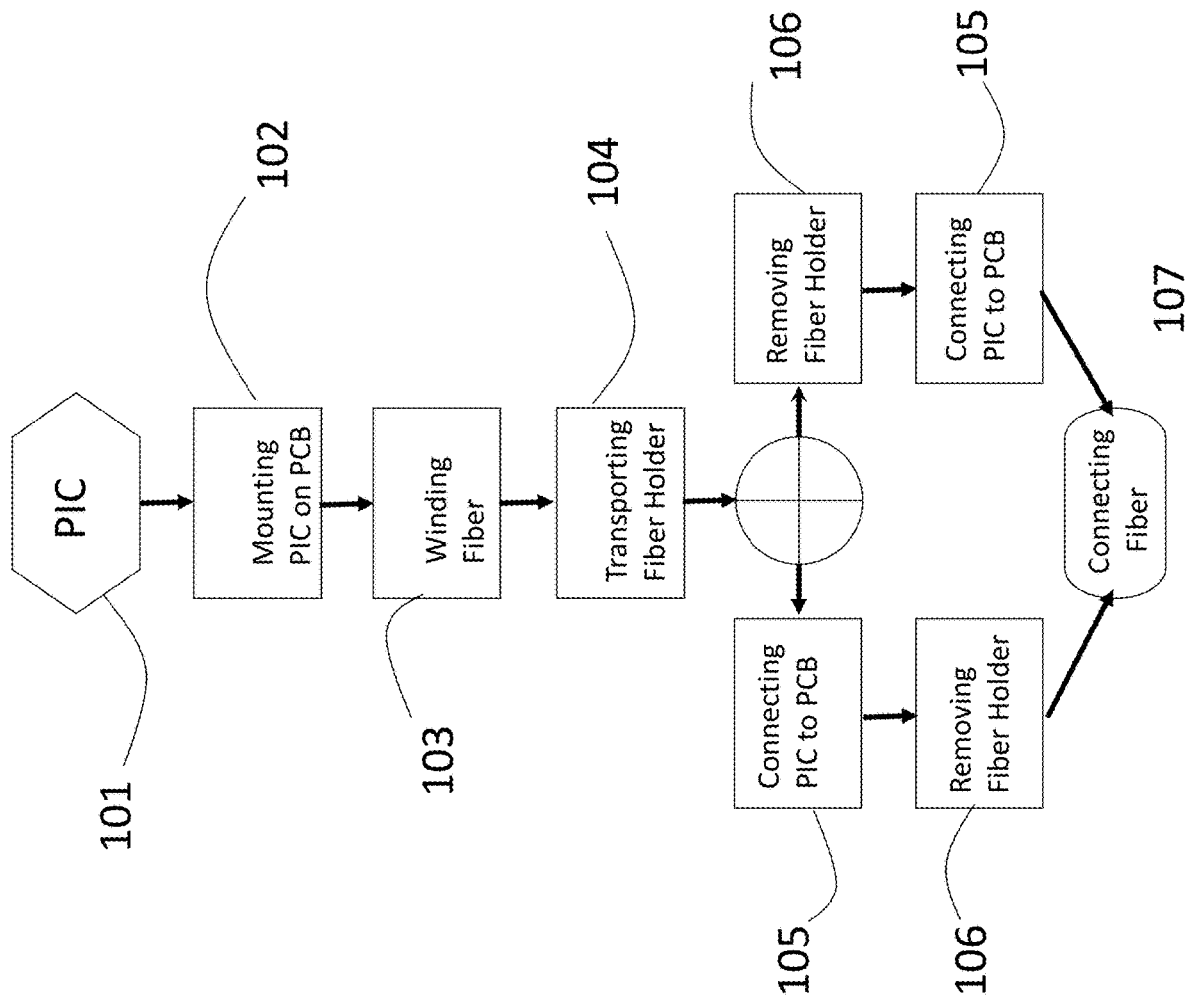
FIG. 9 is a flow chart of an assembly process utilizing the fiber holder device of FIGS. 1 to 8.

The process of mounting a PIC on a circuit board utilizing the fiber holder 1, 1', 1" or 1'" is illustrated in FIG. 9. Step 101 may comprise providing a PIC 2 optionally including a BGA 3. Step 102 may comprise mounting the fiber holder 1, 1', 1" or 1'" on the PIC 2. The fiber holder 1, 1', 1" or 1'" may be temporarily connected to the PIC 2 utilizing one of the aforementioned methods, e.g. double sided tape 61, spring loaded pogo pins 41 or tension screws 51. In step 103, the optical fiber or fibers may then be fed along the routing tracks 12 to the spool 8. The optical fiber or fibers may then be wound onto the spool 8, either manually or by automation. The optical fiber may be fed through the hole 25 or 50 in O-clamp 23 or screw clamp 45, respectively, and wound onto the spool 8 as the O-clamp 23 or the screw claim 45 is rotated around the spool 8. If the optical fiber includes an optical connector, the optical connector may be held in place by a suitable connector on the O-clamp 23, the C-clamp 31, the screw clamp 45 or the snap clamp 55. In step 104, the fiber holder 1, 1', 1" or 1'" and PIC 2 may be picked up, e.g. with a suitable SMT component, transported to an assembly location, and mounted onto a PCB for final assembly. The SMT component may engage or fit into the opening 9 or under the lip 10. The combined fiber holder 1, 1', 1" or 1'" and PIC 2 may be stored in an interim location, e.g. tray, prior to final assembly on the PCB. The fiber holder 1, 1', 1" or 1'" prevents the optical fiber and/or optical connector from interfering with the assembly process steps. Step 105 may comprise connecting the PIC 2 to the PCB, e.g. by heating up the BGA 3 to reflow the solder form the permanent electrical connections. In this step the fiber holder 1, 1', 1" or 1'" may protect the PIC 2 from damage caused by extreme temperature. In step 106, the fiber holder 1, 1', 1" or 1'" may be removed, and either discarded or reused. The removal step may include unwinding the optical fiber from the spool 8 and disconnecting the end of the fiber or the optical connector from the O-clamp 23, the C-clamp 31, the screw clamp 45 or the snap clamp 55. Steps 105 and 106 may be reversed by removal of the fiber holder 1, 1', 1" or 1'" prior to connecting the PIC 2 to the PCB. Finally, in optional step 107, the optical fiber may be connected to an external source or waveguide.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A fiber holder device, comprising:
a body for mounting on a surface-mounted device;
a spool extending from the body capable of receiving and winding therearound one or more optical fibers; and
a fiber guide extension extending from the body for guiding some of the one or more optical fibers from the surface-mounted device to the spool;
wherein the spool includes an opening extending therethrough enabling engagement with an assembly tool and/or providing access to an upper surface of the surface-mounted device.

2. A fiber holder device, comprising:
a body for mounting on a surface-mounted device;
a spool extending from the body capable of receiving and winding therearound one or more optical fibers;
a fiber guide extension extending from the body for guiding some of the one or more optical fibers from the surface-mounted device to the spool; and
a fiber clamp for holding a portion of the one or more optical fibers proximate the spool;
wherein the spool includes a lip extending around an edge thereof;
and wherein the fiber clamp includes an O-clamp capable of fitting over the lip in a first orientation, and being prevented from removal in a second orientation.

3. The fiber holder device according to claim 1, further comprising a fiber clamp for holding a portion of the one or more optical fibers proximate the spool.

4. The fiber holder device according to claim 2, wherein the spool includes an opening extending therethrough enabling engagement with an assembly tool and/or providing access to an upper surface of the surface-mounted device.

5. The fiber holder device according to claim 2, wherein the lip comprises opposite flat ends a first distance apart, and opposite curved sides a second, farther distance apart; and
wherein the O-clamp includes opposite flat sides a third distance apart greater than the first distance but less than the second distance, and opposite curved ends a fourth distance apart, greater than the third distance.

6. The fiber holder device according to claim 2, wherein the O-clamp is capable of rotating around the spool to facilitate winding more of the one or more optical fibers onto the spool.

7. The fiber holder device according to claim 6, wherein the O-clamp includes a hole extending therethrough for receiving a portion of the one or more optical fibers.

8. The fiber holder device according to claim 7, wherein the hole is at an edge of the O-clamp.

9. The fiber holder device according to claim 8, further comprising a connector on the O-clamp for receiving an optical fiber connector.

10. A fiber holder device, comprising:
a body for mounting on a surface-mounted device;
a spool extending from the body capable of receiving and winding therearound one or more optical fibers;
a fiber guide extension extending from the body for guiding some of the one or more optical fibers from the surface-mounted device to the spool; and
a fiber clamp for holding a portion of the one or more optical fibers proximate the spool;
wherein the spool includes a lip extending around an edge thereof, and a first connector; and
wherein the fiber clamp includes a C-clamp including a second connector capable of mating with the first connector.

11. The fiber holder device according to claim 10, wherein the first connector comprises pins extending from the C-clamp; and wherein the second connector comprises L-shaped grooves in the lip for receiving the pins.

12. The fiber holder device according to claim 1, further comprising a first coupler on the body configured to mate with a second coupler on the surface-mounted device for securing the body on the surface-mounted device.

13. The fiber holder device according to claim 12, wherein the first coupler comprises a first tongue and groove coupler extending from the fiber guide extension configured to mate with the second coupler comprising a second tongue and groove coupler extending from the surface-mounted device.

14. The fiber holder device according to claim 12, wherein the first coupler comprises an elongated fastener extending through the fiber guide extension; and wherein the second coupler comprises an indentation in the body.

15. The fiber holder device according to claim 14, wherein the surface-mounted device includes a fiber feedthrough; and wherein the fiber guide extension includes a recess in a lower surface thereof for receiving the fiber feedthrough.

16. The fiber holder device according to claim 1, further comprising at least one groove in the fiber guide extension for guiding each optical fiber onto the spool.

17. A fiber holder, comprising:
a body for mounting on a surface-mounted device;
a spool extending from the body capable of receiving and winding therearound one or more optical fibers;
a fiber guide extension extending from the body for guiding some of the one or more optical fibers from the surface-mounted device to the spool; and
a fiber clamp for holding a portion of the one or more optical fibers proximate the spool;
wherein a portion of the spool comprises a first thread; and
wherein the fiber clamp includes a second thread capable of engaging with the first thread.

18. The fiber holder device according to claim 17, wherein the fiber clamp includes a hole for receiving a portion of the one or more optical fibers, whereby rotation of the fiber clamp simultaneously winds the fiber clamp and each optical fiber onto the spool.

19. The fiber holder device according to claim 3, wherein the fiber clamp includes spring fingers extending into engagement with the body.

20. The fiber holder device according to claim 17, wherein the spool includes an opening extending therethrough enabling engagement with an assembly tool and/or providing access to an upper surface of the surface-mounted device.

* * * * *